(12) United States Patent
Barreto et al.

(10) Patent No.: US 10,747,719 B2
(45) Date of Patent: Aug. 18, 2020

(54) FILE SYSTEM POINT-IN-TIME RESTORE USING RECYCLE BIN AND VERSION HISTORY

(71) Applicant: Microsoft Technology Licensing, LLC, Redmond, WA (US)

(72) Inventors: Jose A. Barreto, Redmond, WA (US); Clement B. Fauchere, Sammamish, WA (US); Meir E. Abergel, Seattle, WA (US); Steven J. Rayson, Redmond, WA (US); Jiashan Song, Newcastle, WA (US); Andrew Sean Watson, Seattle, WA (US); Shaun W. Kimber, Moorhead, MN (US); Ronakkumar N. Desai, Issaquah, WA (US); Andrew Glover, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 446 days.

(21) Appl. No.: 15/836,108

(22) Filed: Dec. 8, 2017

(65) Prior Publication Data

US 2019/0095455 A1 Mar. 28, 2019

Related U.S. Application Data

(60) Provisional application No. 62/561,871, filed on Sep. 22, 2017.

(51) Int. Cl.
*G06F 11/14* (2006.01)
*G06F 16/11* (2019.01)
(Continued)

(52) U.S. Cl.
CPC ........ *G06F 16/128* (2019.01); *G06F 11/1446* (2013.01); *G06F 11/1451* (2013.01);
(Continued)

(58) Field of Classification Search
CPC .............. H04L 67/303; G06F 11/1446; G06F 11/1471; G06F 16/1873
(Continued)

(56) References Cited

U.S. PATENT DOCUMENTS 8,572,045 B1 10/2013 Shah
2007/0185922 A1 8/2007 Kapoor et al.
(Continued)

OTHER PUBLICATIONS

"Back up and restore your files", Retrieved from: «https://support.microsoft.com/en-us/help/17143/windows-10-back-up-your-files», Retrieved Date: Dec. 11, 2017, 3 Pages.
(Continued)

*Primary Examiner* — Marcin R Filipczyk
(74) *Attorney, Agent, or Firm* — Michael Best & Friedrich LLP

(57) ABSTRACT

Systems and methods for restoring a file system to a point-in-time without relying on a backup. One system includes an electronic processor configured to automatically restore a file system to a specified point-in-time by (a) automatically restoring, from a recycle bin, items deleted from the file system after the point-in-time, (b) automatically deleting, from the file system, items created within the file system after the point-in-time, (c) automatically moving items moved within the file system after the point-in-time to a location within the file system associated with the point-in-time, (d) automatically deleting, from the file system, items copied within the file system after the point-in-time, (e) automatically renaming items renamed within the file system after the point-in-time to a name associated with the point-in-time, and (f) automatically restoring, from a version history, a version associated with the point-in-time for items with content modified after the point-in-time.

20 Claims, 15 Drawing Sheets

(51) Int. Cl.
*G06F 16/16* (2019.01)
*G06F 16/18* (2019.01)
*G06F 21/57* (2013.01)
*G06F 11/30* (2006.01)

(52) U.S. Cl.
CPC ........ *G06F 11/1471* (2013.01); *G06F 16/162* (2019.01); *G06F 16/1873* (2019.01); *G06F 21/577* (2013.01); *G06F 11/3034* (2013.01); *G06F 2201/84* (2013.01)

(58) Field of Classification Search
USPC ........................................................ 707/649
See application file for complete search history.

(56) References Cited

U.S. PATENT DOCUMENTS

| | | | |
|---|---|---|---|
| 2008/0307000 A1* | 12/2008 | Paterson | G06F 3/0484 |
| 2008/0307255 A1* | 12/2008 | Chen | G06F 11/1471 |
| | | | 714/13 |
| 2011/0196840 A1 | 8/2011 | Barzilai et al. | |
| 2017/0220615 A1* | 8/2017 | Bendig | G06F 16/215 |
| 2019/0042710 A1* | 2/2019 | Sukhomlinov | G06F 21/78 |

OTHER PUBLICATIONS

Cox, David A., "Time Machine Tutorial: Back Up Your Mac", Retrieved from: «https://www.youtube.com/watch?v=Cd2YaBCXpaM», Apr. 16, 2015, 4 Pages.

"International Search Report and Written Opinion Issued in PCT Application No. PCT/US2018/039196", dated Oct. 15, 2018, 13 Pages.

* cited by examiner

| Operation | ActivityType | ItemID | ParentItemId | Path |
|---|---|---|---|---|
| Create | 1 | <ItemId> | NULL | NULL |
| Move | 2 | <ItemId> | <ParentId> | Previous Path |
| Rename | 3 | <ItemId> | <ParentId> | Previous Path |
| Delete | 4 | <ItemId> | <ParentId> | Previous Path |
| Restore | 5 | <ItemId> | NULL | NULL |
| Update Content | 6 | <ItemId> | NULL | NULL |

40

| CreatedDateTime | ActivityType | ItemID | ParentItemId | RelationName | Path |
|---|---|---|---|---|---|
| 2017/08/21 3:05pm | 2 | 6 | 1 | Y.txt | LF\A\Y.txt |
| 2017/08/21 3:10pm | 2 | 3 | 1 | C | LF\A\C |
| 2017/08/21 3:15pm | 4 | 1 | 0 | A | LF\A |
| 2017/08/21 3:20pm | 3 | 3 | 0 | C | LF\C |
| 2017/08/21 3:25pm | 1 | 8 | NULL | NULL | NULL |

| CreatedDateTime | ActivityType | ItemID | ParentItemId | RelationName | Path |
|---|---|---|---|---|---|
| 2017/08/21 3:10pm | 2 | 3 | 1 | C | LF\A\C |
| 2017/08/21 3:15pm | 4 | 1 | 0 | A | LF\A |
| 2017/08/21 3:10pm | 3 | 3 | 0 | C | LF\C |
| 2017/08/21 3:15pm | 1 | 8 | NULL | NULL | NULL |

FIG. 7

| CreatedDateTime | ActivityType | ItemID | ParentItemId | RelationName | Path |
|---|---|---|---|---|---|
| 2017/08/21 3:20pm | 3 | 3 | 0 | C | LF\C |
| 2017/08/21 3:25pm | 1 | 8 | NULL | NULL | NULL |

FIG. 8

| Original Action | Restore Action | Metadata Source |
|---|---|---|
| Create Item | Delete Item | Current Items |
| Copy Item | Delete Item | Current Items |
| Delete Item | Restore Deleted Item | Recycle Bin + Activity Log |
| Restore Deleted Item | Delete Item | Recycle Bin + Activity Log |
| Update Item | Restore Version | Version History |
| Restore Version | Restore Version | Version History |
| Rename Item | Rename File | Current Items + Activity Log |
| Move Item | Move File | Current Items + Activity Log |

FIG. 9

FILE SYSTEM POINT-IN-TIME RESTORE USING RECYCLE BIN AND VERSION HISTORY

RELATED APPLICATIONS

This application claims priority to U.S. Provisional Application No. 62/561,871 filed Sep. 22, 2017, the entire content of which is hereby incorporated by reference.

FIELD

Embodiments described herein relate to restoring a file system to a specific point-in-time and, in particular, using information in the recycle bin and a version history to restore a file system without relying on a backup of the file system.

SUMMARY

Computer systems may create and store a full backup copy (snapshot) of a file system at various points-in-time to allow the file system to be restored to previous points-in-time. Creating such a full backup, however, has significant storage costs. For example, to establish five possible restore dates for a file system, five full backups must be stored, which requires five times the storage requirements for the file system. Accordingly, backups may be infrequently stored, which limits the available restore dates for a file system. In particular, when a user wants to restore his or her file system to a previous date, the user may need to select from available stored back-ups that may not include the specific date or time desired by the user.

Differential backups and incremental backups are other types of backups that improve the flexibility of full backups by storing changes made to a file system since the last backup (full or incremental) of the file system. Thus, when the file system needs to be restored to a point-in-time after the last backup, the stored changes are used to modify the last backup until it represents the state of the file system at the specified point-in-time. Although a differential or an incremental backup can restore a file system with more granularity than a full backup, storing changes made to an entire file system has similar storage and processing requirements as creating a full backup. Furthermore, unless changes are stored between all backups, the stored changes may only be able to restore a file system to a point-in-time occurring after the last backup and not points-in-time occurring before the last backup.

As an alternative to performing a file system restore, a user may be able to manually undo actions taken with respect to a file system, including restoring deleted items and reverting files to previous versions, to restore the file system to a previous point-in-time. However, manually tracking and undoing each individual change made to an entire file system is a timely process and highly susceptible to human error. For example, when a user creates, updates, moves, or deletes a large number of files within a file system, it might not be easy for the user to manually undo these changes. This is particularly true when a user uses a command line interface or specific applications that make changes to large sets of files. Similarly, when a user is hit by ransomware, a virus, or other harmful code, the user may not know what changes were made to the file system, and, thus, cannot manually undo the changes.

Accordingly, embodiments described herein provide systems and methods for restoring an entire file system to a specific point-in-time using a flexible and storage-efficient method that does not rely on traditional backups (full backups, differential backups, or incremental backups). In particular, as described in more detail below, embodiments described herein restore an entire file system to a specific point-in-time using a change log and information maintained in the recycle bin and version history. In particular, embodiments described herein use a change log to track a minimum amount of information needed to track changes made to a file system and uses the recycle bin and the version history to undo these changes without using a backup of the file system. Thus, a user is able to specify a restore date with almost second-by-second granularity without requiring a backup at each second or other unit of time, which uses less memory and efficiently uses data available in the recycle bin and version history.

For example, one embodiment provides a system for restoring a file system to a state at a point-in-time. The system includes an electronic processor. The electronic processor is configured to receive the point-in-time and automatically retrieve entries from a change log representing changes made to items within the file system after the point-in-time to identify items deleted from the file system after the point-in-time, items created within the file system after the point-in time, items moved within the file system after the point-in-time, items copied within the file system after the point-in-time, items renamed within the file system after the point-in-time, and items with content modified after the point-in-time. The electronic processor is also configured to automatically process the entries retrieved from the change log in reverse order to roll back the changes made to the items within the file system after the point-in-time and restore the file system to the state at the point-in-time. In particular, the electronic processor is configured to processor the entries retrieved from the change log by (a) automatically restoring, from a recycle bin, the items deleted from the file system after the point-in-time, (b) automatically deleting, from the file system, the items created within the file system after the point-in-time, (c) automatically moving the items moved within the file system after the point-in-time to a location within the file system associated with the point-in-time, (d) automatically deleting, from the file system, the items copied within the file system after the point-in-time, (e) automatically renaming the items renamed within the file system after the point-in-time to a name associated with the point-in-time, and (f) automatically restoring, from a version history, a version associated with the point-in-time for the items with content modified after the point-in-time.

Another embodiment provides non-transitory computer-readable medium storing instructions that, when executed by an electronic processor, perform a set of functions. The set of functions includes receiving a point-in-time for restoring a file system to and automatically retrieving entries from a change log representing changes made to items within the file system after the point-in-time to identify items deleted from the file system after the point-in-time, items created within the file system after the point-in time, items moved within the file system after the point-in-time, items copied within the file system after the point-in-time, items renamed within the file system after the point-in-time, and items with content modified after the point-in-time. The set of functions also includes automatically processing the entries retrieved from the change log in reverse order to roll back the changes made to the items within the file system after the point-in-time and restore the file system to a state at the point-in-time. Processing the entries retrieved from the change log may include (a) automatically restoring, from a recycle bin, the items deleted from the file system after the point-in-time, (b)

automatically deleting, from the file system, the items created within the file system after the point-in-time, (c) automatically moving the items moved within the file system after the point-in-time to a location within the file system associated with the point-in-time, (d) automatically deleting, from the file system, the items copied within the file system after the point-in-time, (e) automatically renaming the items renamed within the file system after the point-in-time to a name associated with the point-in-time, and (f) automatically restoring, from a version history, a version associated with the point-in-time for the items with content modified after the point-in-time.

Yet another embodiment provides a method of restoring a file system to a state at a point-in-time. The method includes creating an entry in a change log for each change made to the file system, each entry including an identifier of an item changed within the file system, a date and time the item was changed within the file system, and a type of change made to the item. The method also includes receiving, with an electronic processor, the point-in-time and automatically, with the electronic processor, retrieving a set of entries from the change log representing changes made to items within the file system after the point-in-time to identify items deleted from the file system after the point-in-time, items created within the file system after the point-in time, items moved within the file system after the point-in-time, items copied within the file system after the point-in-time, items renamed within the file system after the point-in-time, and items with content modified after the point-in-time. The method further includes automatically processing, with the electronic processor, the entries retrieved from the change log in reverse order to automatically roll back the changes made to the items within the file system after the point-in-time and restore the file system to the state at the point-in-time. Processing the entries retrieved from the change log includes (a) automatically restoring, from a recycle bin, the items deleted from the file system after the point-in-time, (b) automatically deleting, from the file system, the items created within the file system after the point-in-time, (c) automatically moving the items moved within the file system after the point-in-time to a location within the file system associated with the point-in-time, (d) automatically deleting, from the file system, the items copied within the file system after the point-in-time, (e) automatically renaming the items renamed within the file system after the point-in-time to a name associated with the point-in-time, and (f) automatically restoring, from a version history, a version associated with the point-in-time for the items with content modified after the point-in-time.

BRIEF DESCRIPTION OF THE DRAWINGS

FIG. 3 is a table of example identifiers for change types and an example change log created using the example identifiers.

FIGS. 7 and 8 illustrate entries identified from the sample change log of FIG. 3 for sample restore dates of a file system.

FIG. 9 illustrates actions and metadata used to rollback changes tracked in a change log according to one embodiment.

DETAILED DESCRIPTION

Figure 1:
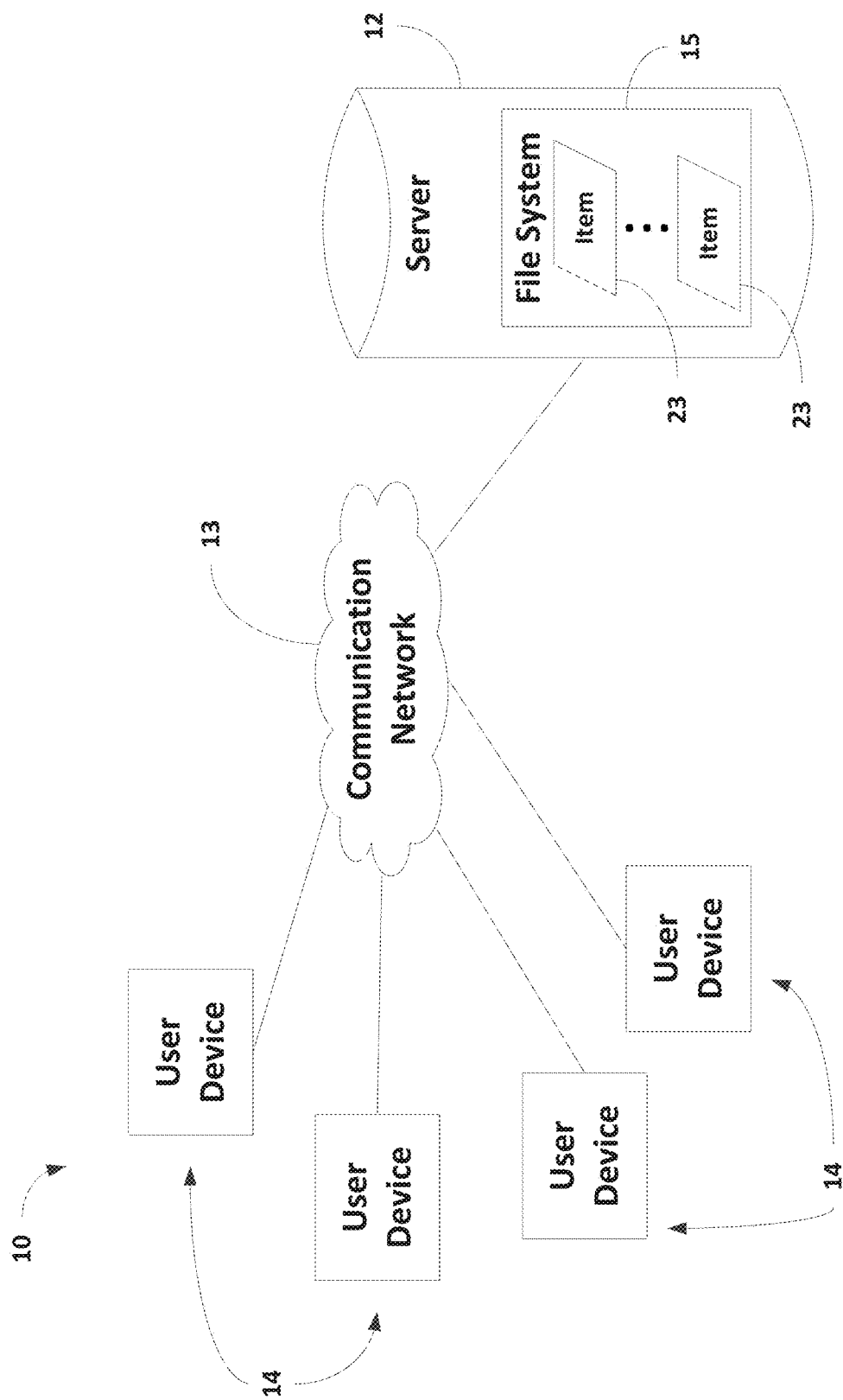
FIG. 1 schematically illustrates a system for managing a file system according to one embodiment.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As described above in the Summary Section, using traditional backups to restore a file system has significant storage costs that limit its usability and flexibility. Accordingly, embodiments described herein provide a more flexible and storage-efficient method of restoring a file system by using information available in the recycle bin and the version history. By using this information in combination with a change log (sometimes also referred to as a change journal), a file system can be restored to a specific point-in-time without the need for a traditional backup. This restoration method is described in the present application with reference to a file hosting service, such as OneDrive provided by Microsoft Corporation. However, it should be understood that the restoration method can be used in other computer systems and configurations. For example, the restoration method can be used locally at a user device, such as a laptop computer, a desktop computer, a tablet computer, a mobile phone, a smart watch or other wearable, or the like to restore the user device to a previous point-in-time using a change log as described below, the recycle bin, and the version history maintained by the user device. Accordingly, the examples and explanations included in the present application relating to restoring a file system within a file hosting service are provided as examples and should not be considered limiting.

FIG. 1 schematically illustrates a system 10 for restoring a file system. As illustrated in FIG. 1, the system 10 includes a remote computer or server 12 and a plurality of user devices 14 (referred to herein collectively as "the plurality of user devices 14" and individually as "a user device 14"). The server 12 and the plurality of user devices 14 communicate over one or more wired or wireless communication networks 13. Portions of the communication networks 13 may be implemented using a wide area network, such as the Internet, a local area network, such as a Bluetooth™ network or Wi-Fi, and combinations or derivatives thereof. The plurality of user devices 14 may be associated with a common domain, such as an enterprise. However, in other embodiments, the plurality of user devices 14 represent individual consumers of a cloud storage service unrelated to a common enterprise or sharing of a common local area network or the like. It should be understood that the server 12 may communicate with any number of user devices 14 and four user devices 14 are illustrated in FIG. 1 purely for illustrative purposes. Also, in some embodiments, a user device 14 may communicate with the server 12 through one or more interim devices.

The server 12 provides a file hosting service. In particular, the server 12 allows users (through the plurality of user devices 14) to upload files to the server 12 (or other remote storage locations managed by the file hosting service) and access the uploaded files through a web browser application or a dedicated application, such as a mobile application. Thus, the user's files are accessible through the file hosting service regardless of the specific device used by the user. In some embodiments, the user can also create files with the file hosting service or edit uploaded files within the file hosting service and can organize updated files into one more folders. Users can also synchronize uploaded files with files locally stored on the user's user device 14, which allows a user to use the file hosting device as a backup or recovery service. Users may also be allowed to share uploaded items managed by the file hosting service with the public or specific users. As described in more detail below, users can also restore files managed by the file hosting service to a specific point-in-time.

As used in the present application, the term "file" includes any type of data object, or record, including, for example, word-processing documents, spreadsheets, presentations, email messages, images, videos, contacts, settings, keys, software code, and the like. Also, the term "file system" as used in the present application includes a collection of files, including an organized collection of files where files are organized into one more directories or folders. Accordingly, as illustrated in FIG. 1, the server 12 may manage a plurality of file systems 15 and each file system 15 may be associated with a particular user or groups of users. It should be understood that the functionality described herein as being performed by the server 12 and, in particular, the file hosting service, may be distributed among multiple devices, such as multiple servers operated within a cloud environment. Accordingly, in some embodiments, the file systems 15 managed by the file hosting service may be stored on a multiple servers.

Figure 2:
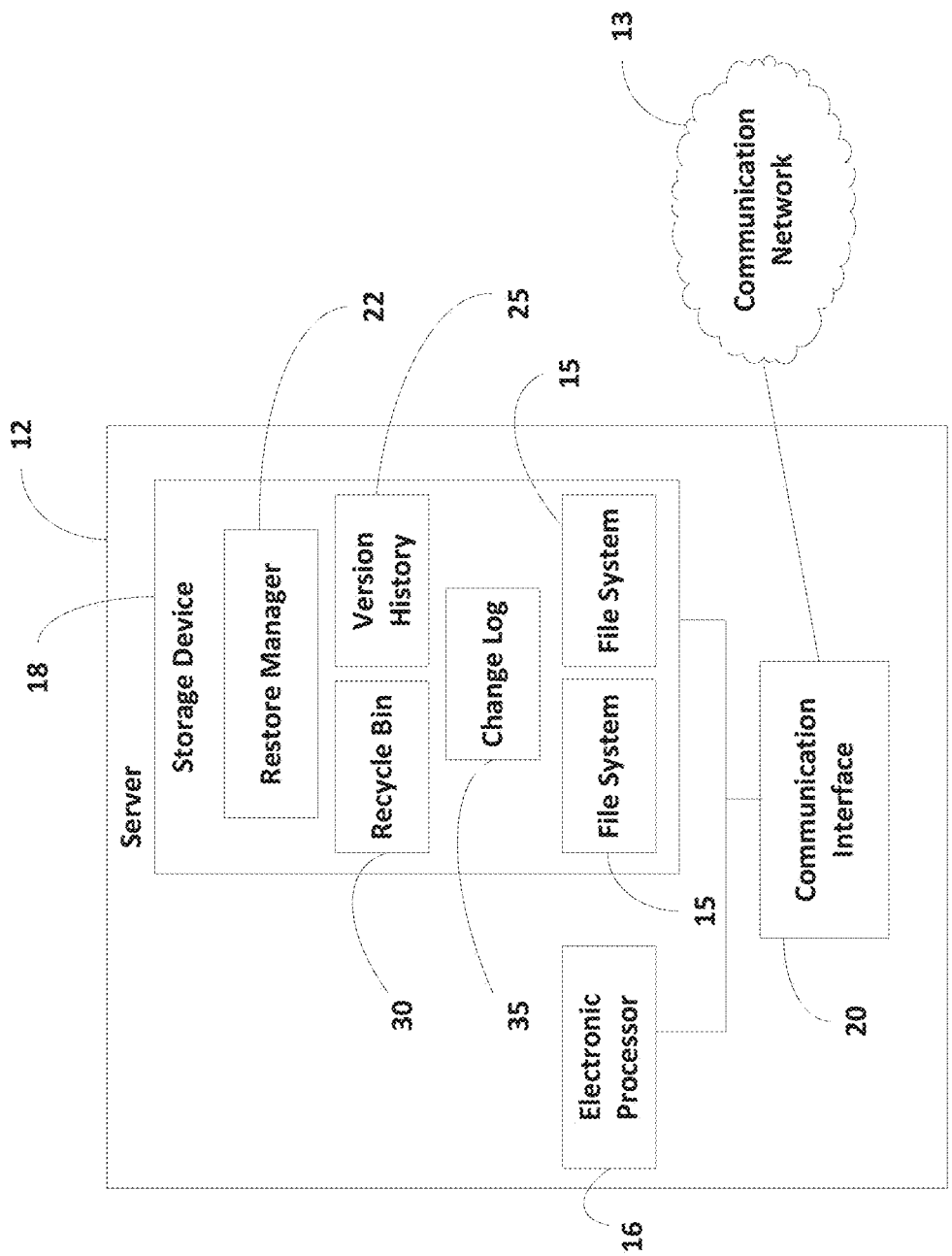
FIG. 2 schematically illustrates a server included in the system of FIG. 1 according to one embodiment.

As illustrated in FIG. 2, the server 12 includes an electronic processor 16 (for example, a microprocessor, application-specific integrated circuit (ASIC), or another suitable electronic device), a storage device 18 (for example, a non-transitory, computer-readable storage medium), and a communication interface 20, such as a transceiver, for communicating over the communication networks 13 and, optionally, one or more additional communication networks or connections. The electronic processor 16, the storage device 18, and the communication interface 20 communicate over one or more communication lines or buses. It should be understood that the server 12 may include additional components than those illustrated in FIG. 1 in various configurations and may perform additional functionality than the functionality described in the present application. For example, as noted above, in some embodiments, the functionality described herein as being performed by the server 12 may be distributed among multiple devices, such as multiple servers operated within a cloud environment.

The electronic processor 16 executes instructions stored in the storage device 18. In particular, as illustrated in FIG. 2, the storage device 18 stores a restore manager 22. The restore manager 22 is a software application executable by the electronic processor 16. As described below, the restore manager 22 restores a file system 15 managed by the file hosting service to a specific point-in-time. It should be understood that the functionality described herein as being performed by the restore manager 22 may be distributed among multiple software applications. Also, in some embodiments, the restore manager 22 performs additional functionality, including, for example, creating and maintaining a change log used to restore the file system 15 as described below.

In some embodiments, the storage device 18 also stores one or more files systems 15. As illustrated in FIG. 1, each file system 15 stores one or more items 23. As used in the present application, an "item" includes a file or a folder. For example, a file system 15 may include a plurality of files organized into one or more folders. As noted above, in some embodiments, file systems 15 managed by the file hosting service may be stored on multiple servers.

As illustrated in FIG. 2, the storage device 18 also stores a version history 25, a recycle bin 30, and a change log 35. However, it should be understood that the version history 25, the recycle bin 30, and the change log 35 may be stored or distributed among multiple storage devices 18 within the server 12, multiple servers, or multiple devices, including, for example, one or more user devices 14. As described in more detail below, the restore manager 22 uses these three components to restore a file system 15 to a particular point-in-time without the need for a traditional backup of the file system 15.

The version history 25 tracks versions of files. For example, the version history 25 may include a full copy of prior versions of a file, changes made to the content of a file, or a combination thereof. Thus, the version history 25 allows a user to manually restore a file to a previous version. In some embodiments, the version history 25 creates and tracks a version of a file each time file is modified, each time the file is saved, at a predetermined frequency (daily), or the like. In some embodiments, the version history 25 may similarly track changes to folders. In some embodiments, the file hosting service creates and maintains a version history 25 for each user of the file history service, each item 23 included in the file system 15, or a combination thereof.

In some embodiments, limits are placed on the number of versions maintained in the version history 25 to avoid using too much storage space (especially when dealing with large files). For example, in some embodiments, the version history 25 may be configured to maintain a predetermined maximum number (for example, thirty to fifty) of versions of a file at a time before purging versions to make room for new versions. In some embodiments, the retention period for the version history 25 may be set based on the retention period for the recycle bin 30 and the change log 35 as described below. For example, the retention period for the version history 25 may be set to the same retention period as the recycle bin 30 and the change log 35.

Even when a quantity limit is set for the version history 25, the version history 25 may accumulate a set of versions that restricts the user's ability to restore a file system 15 to previous points-in-time. For example, assume a version history 25 is configured to store thirty versions, and a user makes thirty changes to a file over a one hour period. In this situation, the version history 25 includes thirty prior versions of the file but all of the versions are associated with the past hour. Accordingly, when the version history 25 is used to restore the file system 15, the user may be limited to restoring the file system 15 to a state occurring within the past hour because no prior versions are available for the file except within the past hour.

Thus, one or more rules may be applied to the version history 25 to create a consistent set of files for performing a restore. For example, the file hosting service may be configured to keep a minimum number of versions of a file per unit of time in the version history 25, such as at least one version of a file per unit of time (for example, one version per day). However, in some embodiments, the version history 25 may not keep a version of a file for a particular unit of time (for example, a particular day) if the file has not changed from the previous stored version. Also, in some embodiments, if there are multiple versions for a particular unit of time (for example, a particular day), the version history 25 may also retain a predetermined version, such as the earliest version, the latest version, or the like. By applying these rules, the version history 25 stores a consistent set of previous versions that provides flexibility when restoring a file system 15 using the version history. In particular, assuming the version history 25 is configured to store at least one version of each file per day (such as the version existing at the start of each day), as described in more detail below, a user can restore the entire file system 15 to any day within the retention period for the version history 25. Without such rules, the versions maintained for individual files may not allow a file system 15, as a whole, to be properly restored to a particular previous point-in-time.

The recycle bin 30 (sometimes referred to as a trash can, garbage can, or the like) stores items 23 deleted from a file system 15. The recycle bin 30 is a special directory where deleted items are stored (rather than being permanently deleted) in case the items need to be recovered. For example, a user can access the recycle bin 30 (by clicking an icon, navigating to a directory, or the like) to view deleted items and manually select one or more deleted items to restore. Like the version history 25, the recycle bin 30 may have a retention period. For example, the recycle bin 30 may only hold items deleted within a past period of time, such as the past thirty days. As noted above, in some embodiments, the recycle bin 30 may have the same retention period as the version history 25.

The change log 35 is a table, database, or similar data structure that stores entries representing changes to a file system 15. In particular, as a user interacts with a file system 15 through the file hosting service (requested changes submitted to an application programming interface (API) for the file hosting service), the change log 35 generates and stores entries representing changes to the file system 15. In particular, an entry is created for the change log 35 when an item is created, an item is moved, an item is renamed, an item is deleted, an item is restored from the recycle bin 30, or the content of the item is updated (including reverting to a previous version of an item and including, in some embodiments, updating metadata of the item, including, for example, a file type or structure identifier, such as xschema, alternate data streams, or the like). Thus, each entry in the change log 35 may include a change date and time, a change type, and an identifier of the item changed. Depending on the type of change performed, an entry in the change log 35 may also include an identifier of a parent item to the item changed, a relation name, a path, or a combination thereof. The identifier of the parent item may represent the folder including the item that was changed. The relation name may represent the name of a file or a folder before the file or folder was renamed (when the change is the renaming of an item). The path may represent a full path of the item before the item was changed.

Figure 4A:
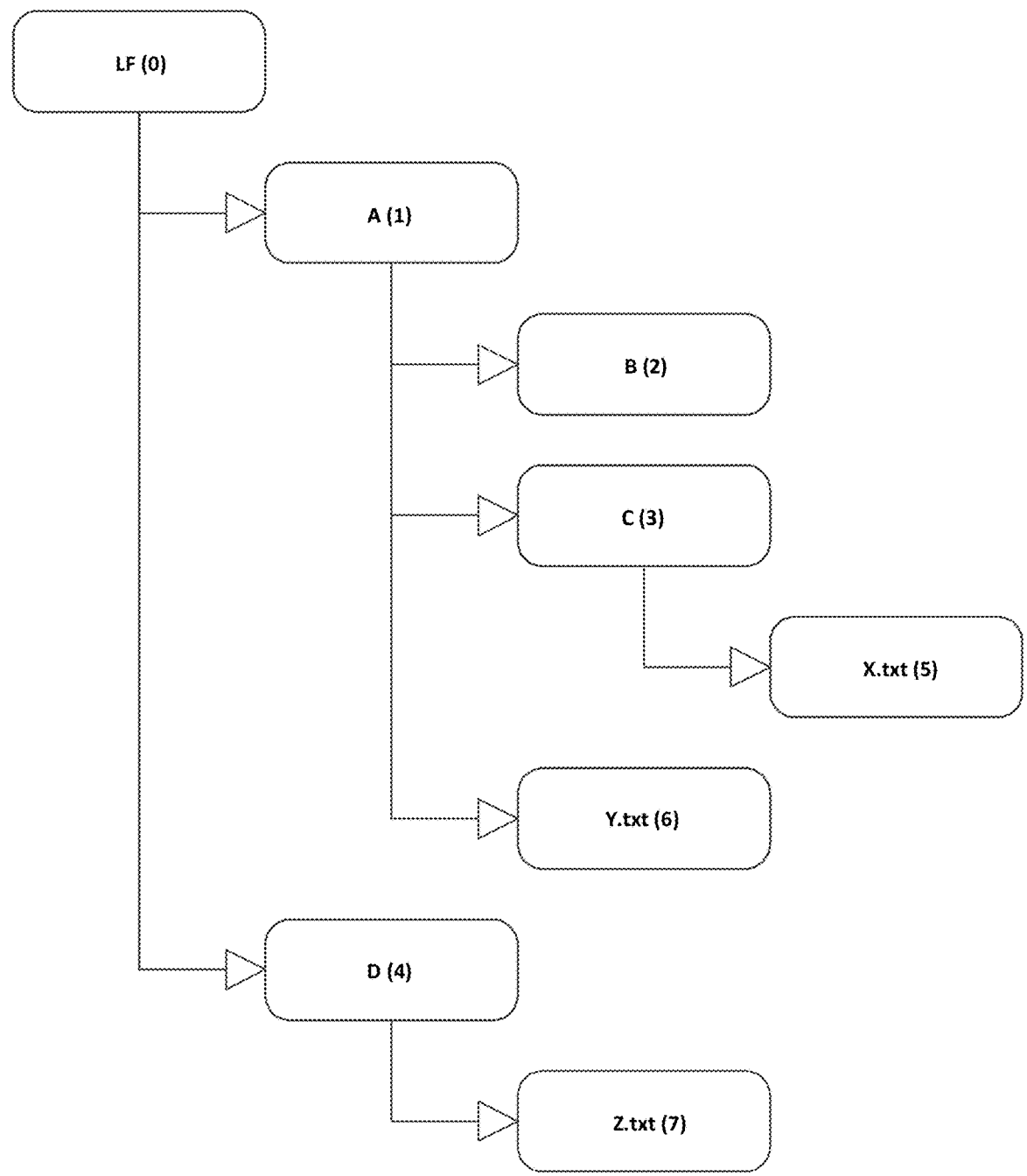
FIGS. 4a-f graphically illustrates changes made to a file system represented in the example change log of FIG. 3.
Figure 4B:
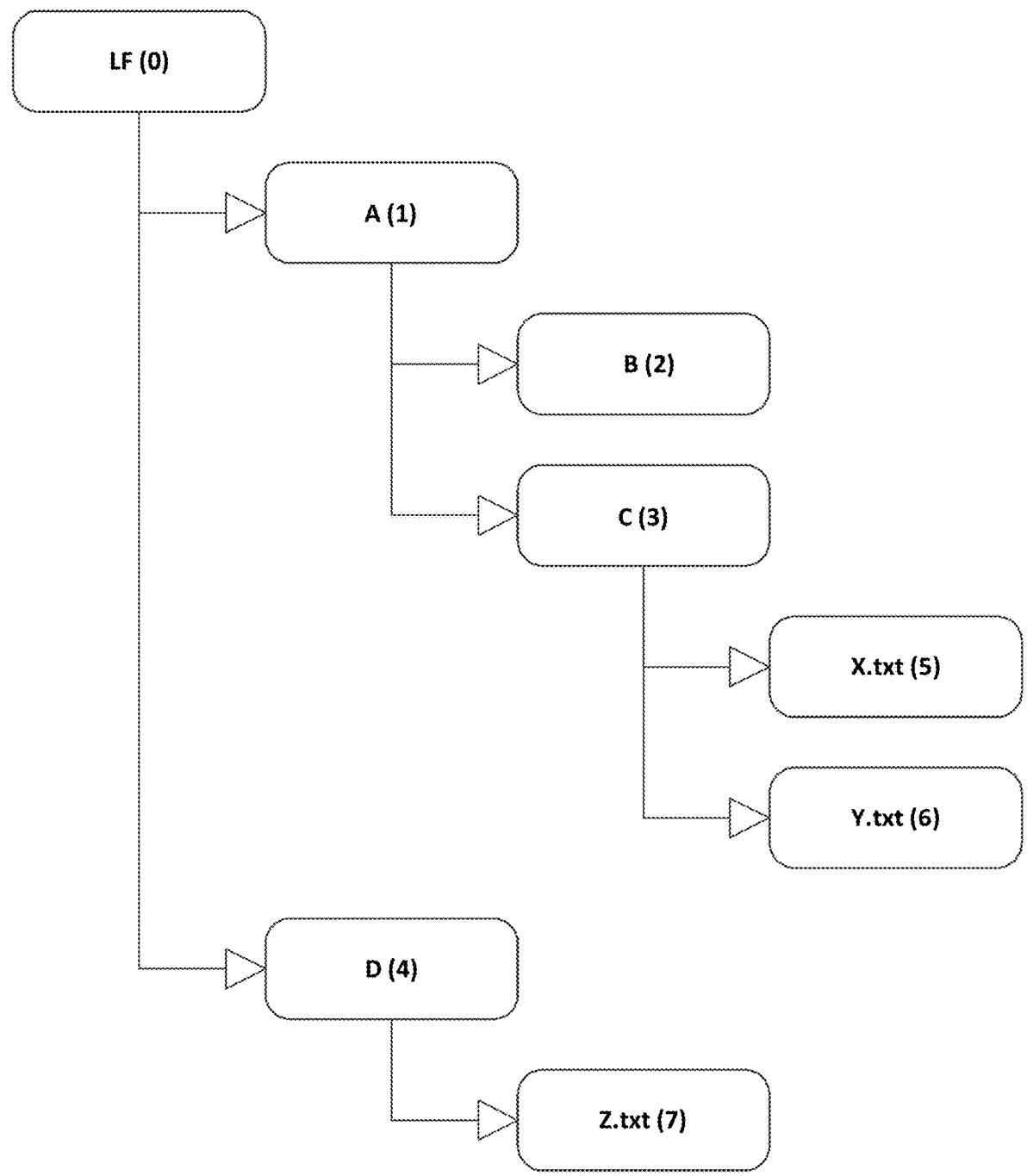
Figure 4C:
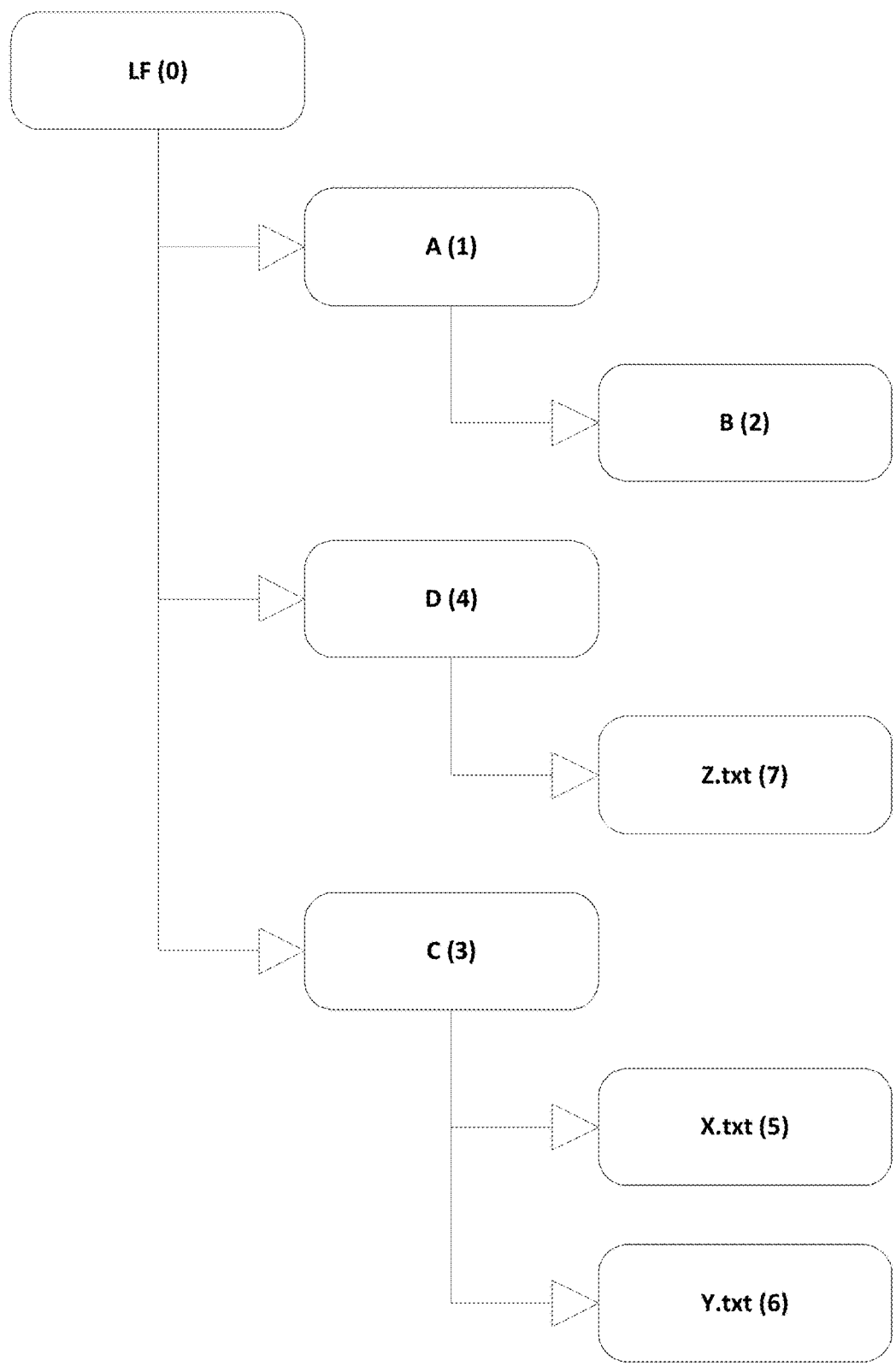
Figure 4D:
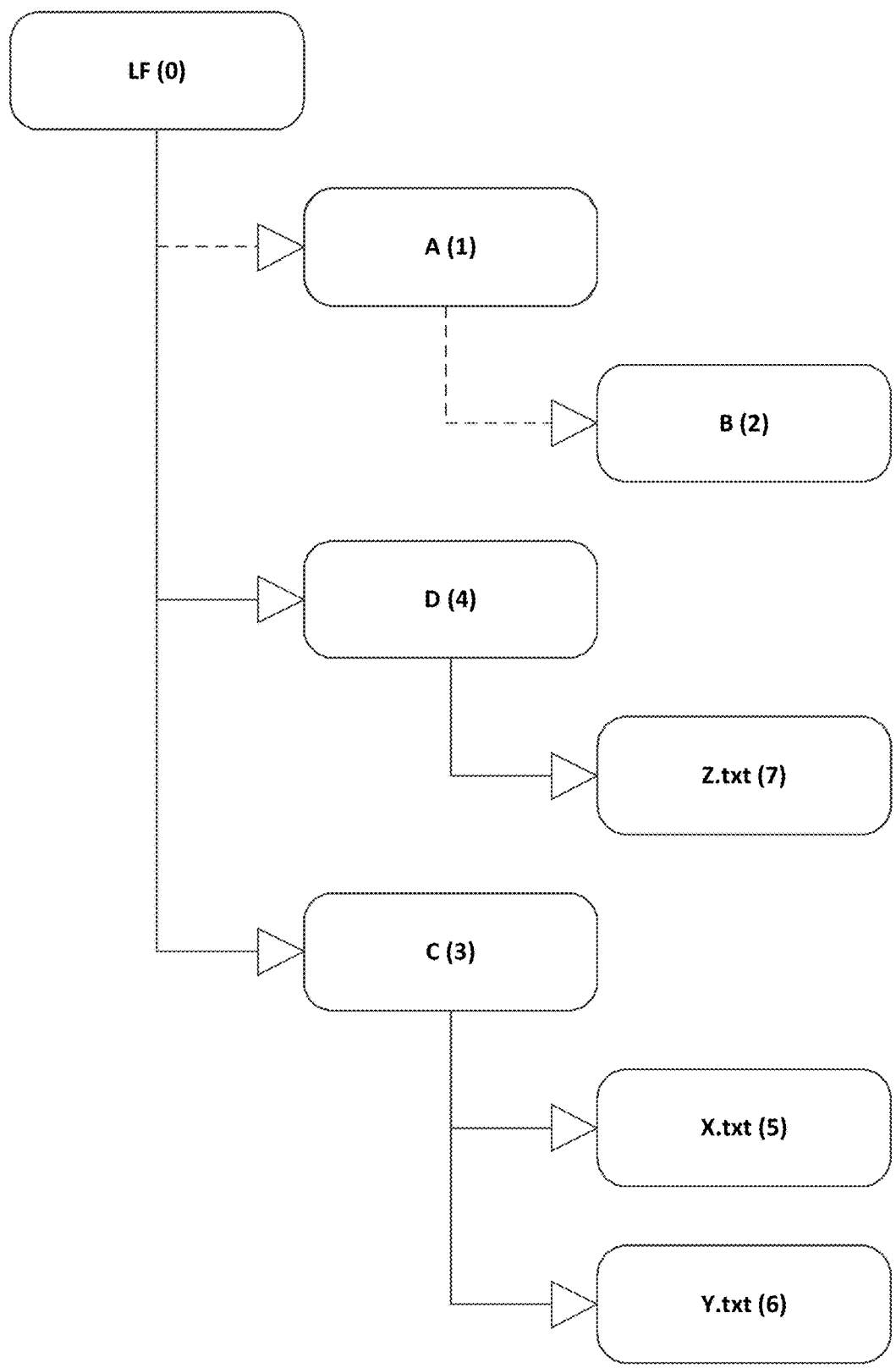
Figure 4E:
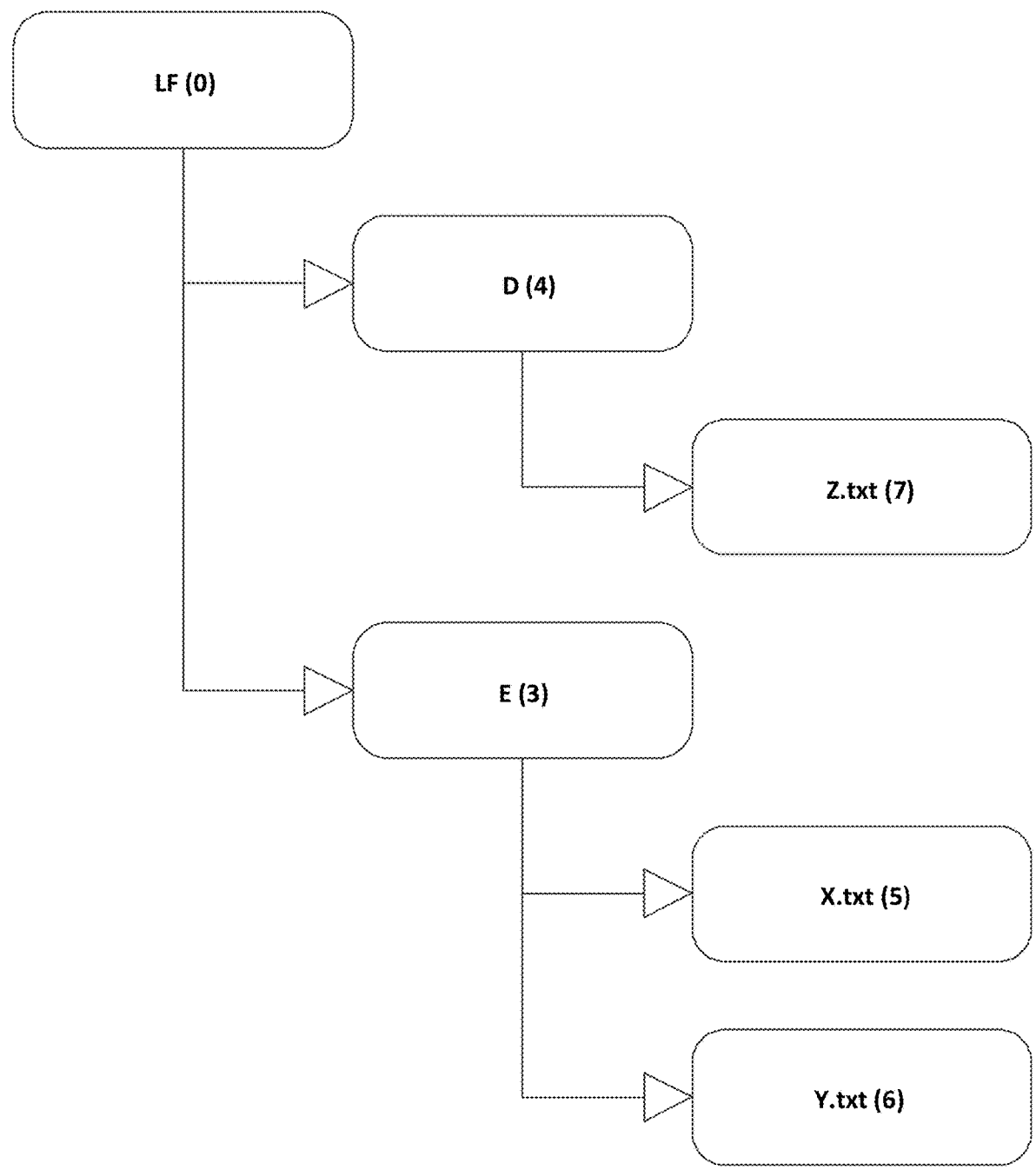
Figure 4F:
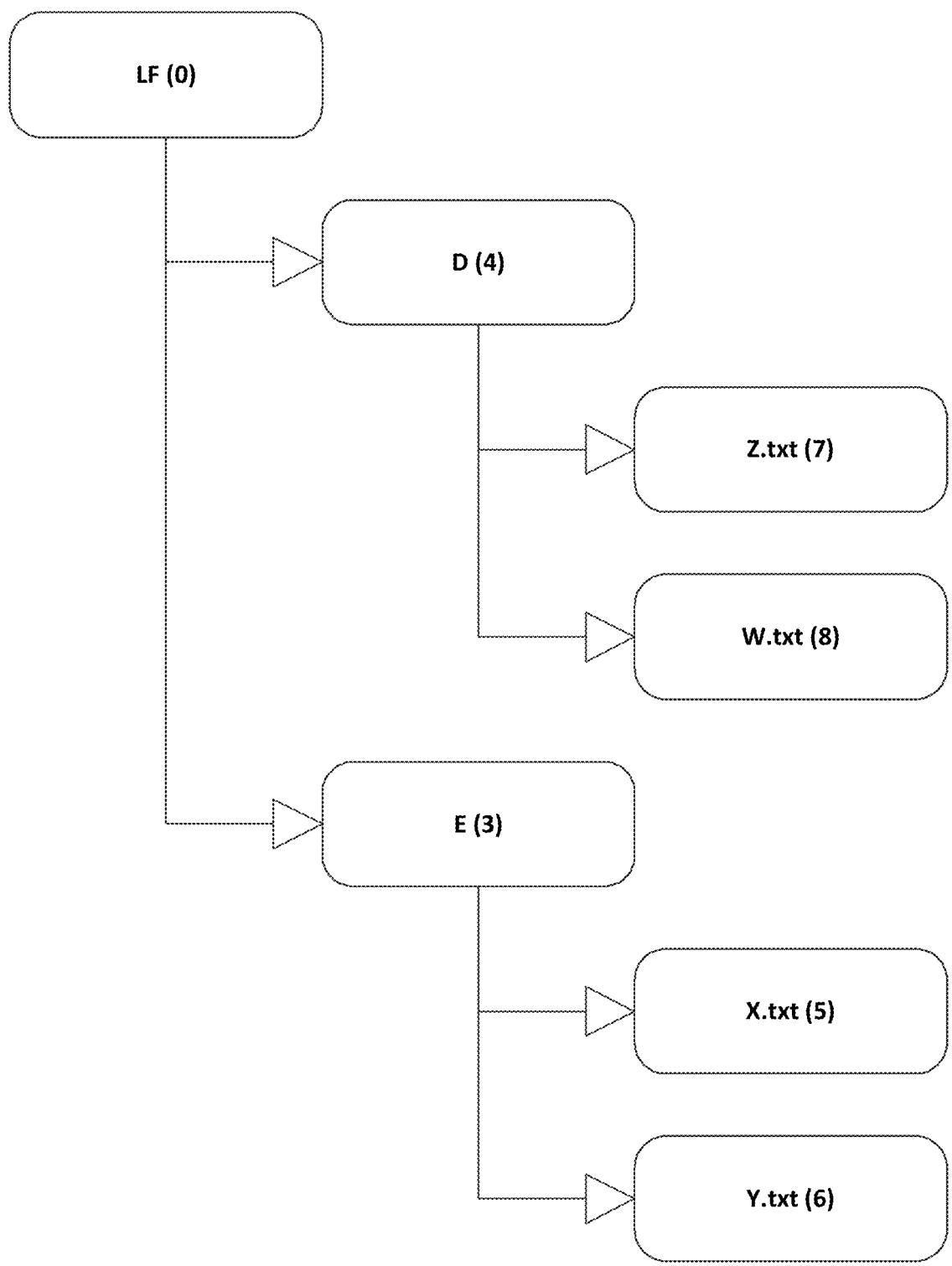

For example, FIG. 3 illustrates a table 40 of example identifiers for different change types and an example change log 35a using the example identifiers, and FIGS. 4a-4f graphically illustrate the changes tracked in the example change log 35a. In particular, as illustrated in the example change log 35a, at 3:05 pm on Aug. 21, 2017, item (6) (which is a text file named "Y.txt" as illustrated in FIG. 4a) was moved (activity type "2" is a rename change as illustrated in the table 40) to item (1) (which is folder "A" as illustrated in FIG. 4b). As also illustrated in the example change log 35a, at 3:10 pm on Aug. 21, 2017, item (3) (which is folder "C" as illustrated in FIG. 4c) was moved to item (1). Similarly, at 3:15 pm on Aug. 21, 2017, item (1), was deleted (see FIG. 4d), and at 3:20 pm on Aug. 21, 2017, item (3) was renamed as "E" (see FIG. 4e). Also, at 3:25 pm on Aug. 21, 2017, new item (8) (a new text file) was created named "W.txt" and added to item (4) (folder "D") (see FIG. 4f).

In some embodiments, the restore manager 22 is configured to create and maintain the change log 35. However, in other embodiments, one or more separate applications executed as part of the file hosting service create and maintain the change log 35. Like the version history 25 and the recycle bin 30, the change log 35 may have retention period that defines what entries are retained in the change log 35 and when entries are purged from the change log 35. The retention period for the change log 35 may specify the time period for restoring the associated file system 15. For example, when the change log 35 has a retention period of thirty days, the change log 35 may be used, as described below, to restore the associated file system 15 to points-in-time within the past thirty days. Accordingly, the retention period of the change log 35 may be configured in various ways based on the constraints and policies of the file hosting service, which may consider storage requirements and availabilities, subscription levels, enterprise settings, and the like. As noted above, in some embodiments, the retention period for the change log 35 may also define the retention period and other configuration settings for the version history 25, the recycle bin 30, or both.

Returning to FIG. 1, the plurality of user devices 14 includes one or more desktop computers, laptop computers, tablet computers, terminals, smart telephones, smart televisions, smart wearables, servers, databases, other types of computing devices, or a combination thereof. Similar to the server 12, each of the plurality of user devices 14 includes an electronic processor (for example, a microprocessor, application-specific integrated circuit (ASIC), or another suitable electronic device), a storage device (for example, a non-transitory, computer-readable storage medium), and a communication interface, such as a transceiver that communicates with the server 12 over the communication networks 13 and, optionally, one or more other communication networks or connections. One or more of the plurality of user devices 14 may include additional components than those listed above in various configurations and may perform additional functionality than the functionality described in the present application.

As noted above, to use the file hosting service, users upload items to the server 12 using the user devices 14, create an item through the server 12 using the user devices 14, and modify items previously uploaded or created through the server 12. As also noted above, the file hosting service creates and maintains a change log 35 to track changes made by to the file system (including changes made by the user, changes made on behalf of the user by other software applications, and changes made without the user's authorization or knowledge, such as changes made by ransomware or other malicious code or activity).

Figure 5:
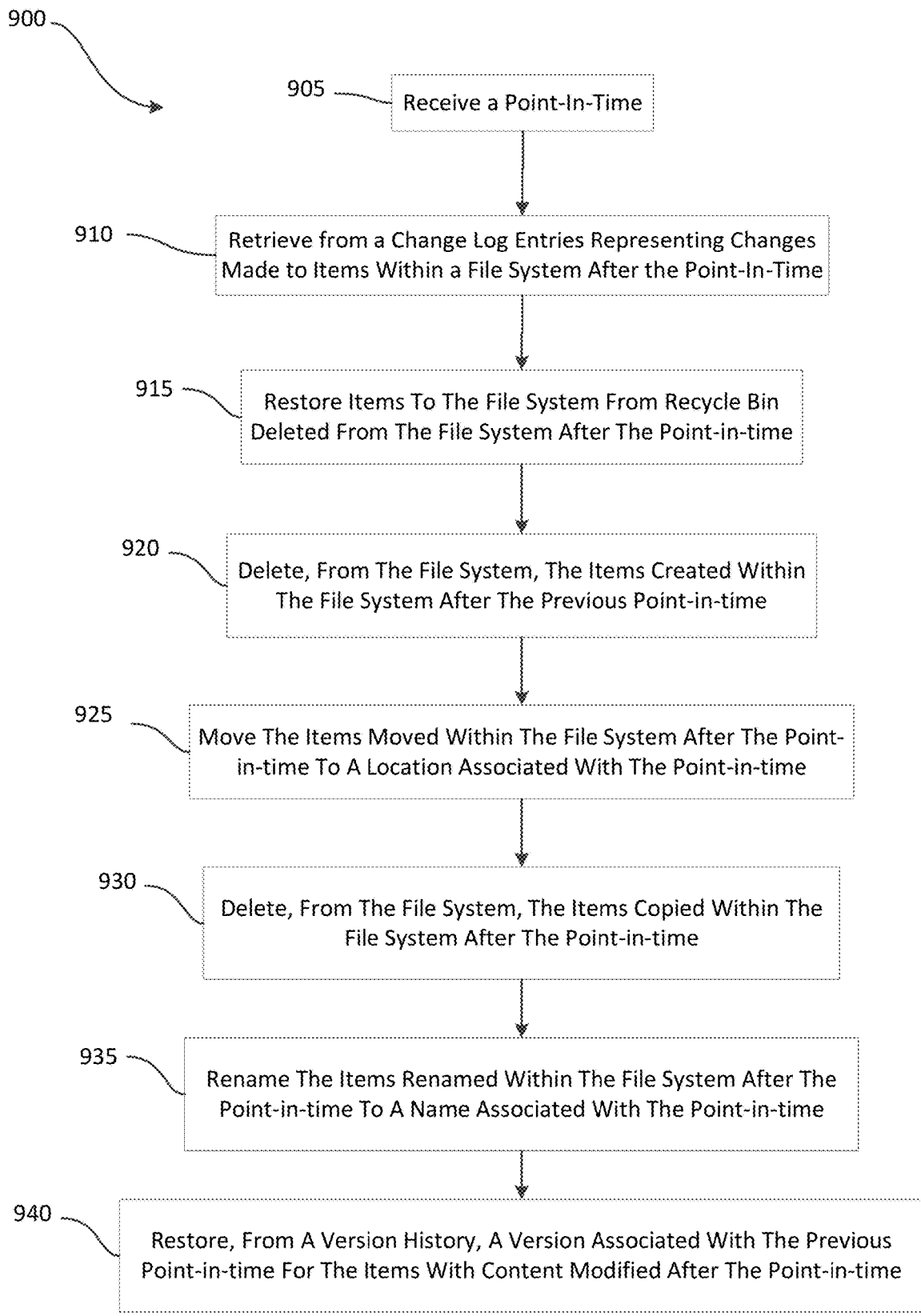
FIG. 5 is a flow chart of a method for restoring a file system performed by the server of FIG. 2 according to one embodiment.

Subsequently, when a user desires to restore his or her file system 15 to a previous point-in-time, the change log 35, in combination with the version history 25 and the recycle bin, is used to restore the file system 15 to a user-specified point-in-time. For example, FIG. 5 illustrates a method 900 for restoring a file system 15 to a state existing at a previous point-in-time. The method 900 may be performed by the server 12 and, in particular, by the restore manager 22 as executed by the electronic processor 16 included in the server 12. However, as noted above, the functionality performed by the restore manager 22 may be distributed among multiple software applications and, in some embodiments, the functionality or portions thereof may be performed by other devices than the server 12, including a user device 14, other servers included in the file hosting service, or the like.

Figure 6:
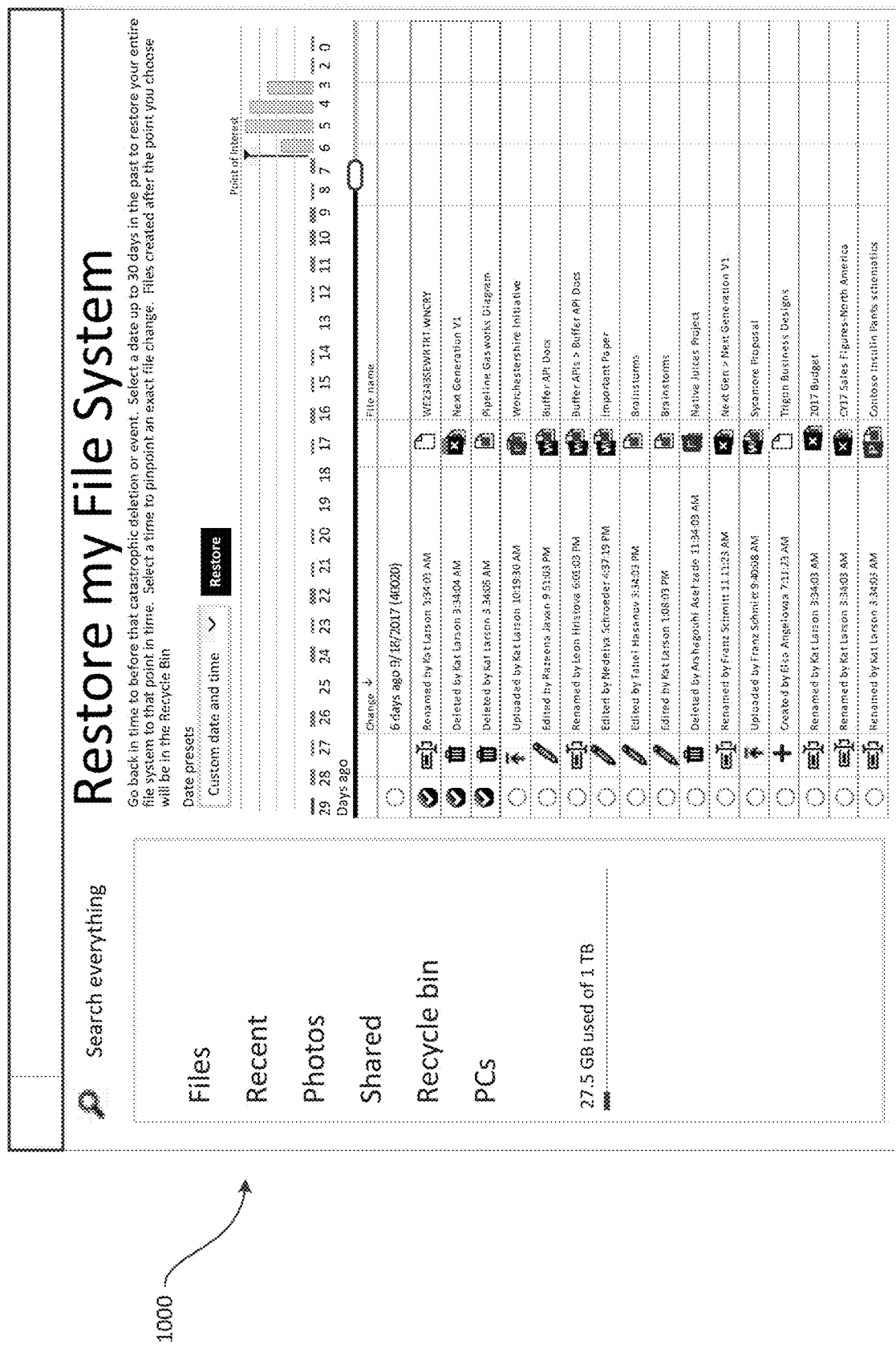
FIG. 6 illustrates a user interface for initiating a restore of a file system according to one embodiment.

As illustrated in FIG. 5, the method 900 for restoring a file system to a state at a point-in-time begins by receiving a point-in-time to restore the file system 15 to (at block 905). A restore of a file system 15 may be initiated in various ways. In some embodiments, the file hosting service may provide a user interface that allows a user to initiate a restoration of a file system 15 by selecting a particular point-in-time (a date, time, or combination thereof), which is referred to in the present application as a "restore date." For example, as illustrated in FIG. 6, the file hosting service may provide a user interface 1000 that includes an input mechanism that allows a user to enter or select a restore date. The user interface may also show changes (e.g., quantity of changes) made for a file system 15 over one or more time periods. For example, as illustrated in FIG. 6, the user interface 1000 may include a histogram of the number of changes made over a timeline. The user interface 1000 may also provide further details on individual changes, such as by listing the type of change made to particular items and when the change was made.

In some embodiments, in addition to receiving a restore date from a user, the user interface 1000 may receive one or more restore parameters, such as an identifier of the file system or item to be restored. For example, in some embodiments, by default, a restore may be performed on an entire file system 15 associated with a user (from a root or active or live folder). However, in other embodiments, a restore may only be performed for particular files, folders, and files with particular parameters (for example, edited within a predetermined time period, edited or created through a particular device, or the like) within the file system 15.

A user may access a user interface such as the interface 1000 illustrated in FIG. 6 through the client application for the file hosting service. Similarly, the file hosting service may be configured to identify when a user is attempting to rollback a file system 15 to a previous state (tracking restorations from the recycle bin 30 or the version history 25) and may suggest that the user perform an entire restore of the file system 15 through the user interface. Alternatively or in addition, a user may access such a user interface through a message, such as an email message, reporting suspicious activity for a file system 15. For example, one or more systems (referred to herein as monitoring system) may monitor changes made to file systems 15 to detect ransomware attacks (encryption or deletion of large amount of items) and alert users to suspicious activity. The alerts may include a link to access a user interface to initiate a restore of the user's file system 15, and, in some embodiments, the monitoring system may also identify suspicious activity and set a suggested restore date (for example, within the user interface) based on the suspicious activity. Similar alerts and links may be provided within a user interface provided by the monitoring systems, such that a user can quickly initiate a restoration when a monitoring system has detected suspicious activity. In some embodiments, the systems monitoring for suspicious activity may be configured to automatically initiate a restore when suspicious activity is detected or has been confirmed with or without seeking approval of the user. Also, in some embodiments, a restore date, restore parameters, or a combination thereof may be received through an API.

After receiving the restore date (at block 905), the electronic processor 16 retrieves, from the change log 35, entries representing the changes made to the file system 15 after the point-in-time (at block 910). In particular, the restore manager 22 uses the change log 35 created for the file system 15 to determine what changes must be reversed or rolled back to restore the file system 15 to the specified point-in-time. For example, using the example change log 35*a* illustrated in FIG. 3 and a restore date of 2017/08/21 3:06 pm, the restore manager 22 retrieves the entries illustrated in FIG. 7 as representing the changes made to the file system 15 after the specified restore date. Similarly, using the example change log 35*a* illustrated in FIG. 3 and a restore date of 2017/08/21 3.16 pm, the restore manager 22 identifies the entries illustrated in FIG. 6 as representing the changes made to the file system after the specified restore date.

After retrieving the relevant entries from the change log 35 (at block 910), the electronic processor 16 automatically processes the entries in reverse order to reverse or roll back the changes represented by the relevant entries. In particular, the restore manager 22 reverses each change represented by a relevant entry as specified in the table illustrated in FIG. 9. For example, as illustrated in FIG. 9, the restore manager 22 rolls back a create change, a copy change, and a restore deleted item change by deleting the created, copied, or restored item from the current state of the file system 15. Similarly, the restore manager 22 rolls back a delete change by restoring a deleted item from the recycle bin 30. In addition, the restore manager 22 rolls back a rename change by changing the name of the item back to the name specified in the change log 35 (the relation name). Similarly, the restore manager 22 rolls back a move change by moving an item back to its previous location within the file system as specified in the change log 35 (the parent identifier, previous path, or combination thereof). Furthermore, the restore manager 22 rolls back an update or a restore change by restoring a previous version of an item from the version history 25 based on the restore date.

Accordingly, as illustrated in FIG. 5, based on the relevant entries retrieved from the change log 35, the electronic processor 16 restores, from recycle bin 30 to the file system 15, items that were deleted from the file system 15 after the point-in-time (at block 915), deletes (a soft delete that moves the deleted items to the recycle bin 30), from the file system 15, the items created within the file system 15 after the previous point-in-time (at block 920), and moves the items moved within the file system 15 after the point-in-time to a location associated with the point-in-time (at block 925). The electronic processor 16 also deletes, from the file system 15, the items copied within the file system 15 after the point-in-time (block 930), renames the items that were renamed within the file system 15 after the point-in-time to a name associated with the point-in-time (block 935), and restores, from the version history 25, a version associated with the previous point-in-time for the items with content modified after the point-in-time (block 940).

Figure 10:
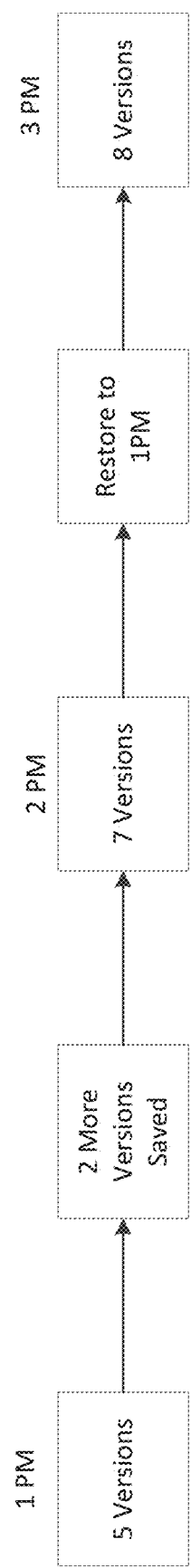
FIG. 10 illustrates a sample time line of the changes made to a version history during restoration of a file system.

In some embodiments, if an item that was deleted has been purged (manually) from the recycle bin 30, the item is not restored. Similarly, if the version history 25 for an item was purged (manually), the content of an item may not be restored. Accordingly, the file hosting service may generate a message warning users of the impact of these purges on the ability to restore the file system 15 when a user attempts such a purge and may prompt a user to verify a purge or authenticate the user as a human (for example, using credentials, CAPTCHA (Completely Automated Public Turing Test to tell Computers and Humans Apart) authentication, multi-factor authentication, or a combination thereof). Also, in some embodiments, the restoration process does not restore the recycle bin 30 or the version history 25, which limits data loss by retaining data that allows a user to restore the file system 15 to other points-in-time, including points-in-time occurring after an initial restore date. For example, FIG. 10 shows an example timeline of the version history 25 of an item. As illustrated in FIG. 10, at 1:00 pm there are five versions of the item available through the version history 25, and at 2:00 pm two more versions of the item have been saved so there are a total of seven versions of the item maintained in the version history 25. At 3:00 pm, the item is reverted to the version of the item at 1:00 pm as part of a file system restore. As part of this restore, however, the restore manager 22 does not delete nor overwrite the versions of the item that were created after 1:00 pm. Rather, the restore manager 22 creates a new version of the item associated with 3:00 pm that is a copy of the version of the item at 1:00 pm. Therefore, after the restoration process is complete, there are eight versions of the item in the version history 25. Accordingly, the version history 25 allows the item to be restored back to its state at 2:00 pm (a restoration back to a future state).

In some embodiments, the restore manager 22 rolls back the changes identified by the entries retrieved from the change log 35 sequentially. In other embodiments, the restore actions may be placed in one or more queues for parallel processing. If a particular restore action cannot be processed (e.g., there is a collision as another queue is accessing the same item that is being accessed by the queue or an item doesn't exist yet in the current state of the file system 15), the restore action may be moved to another queue (for sequential processing). If the action still cannot be processed after moving to the new queue, the restore manager 22 may attempt to bypass the action and return to the action later to see if the action can be processed.

While the restoration is being performed, items included in the file system 15 (including folders or other directory) may be read-only to prevent collisions. Also, in some embodiments, the restore manager 22 (or a separate software application) may provide a status message or user interface to a user that informs the user of the restoration progress (e.g., what items have been restored and what items have yet to be restored, a time to completion, and the like). Any errors occurring during a restoration (e.g., an item could not be restored because it had been purged from the recycle bin 30) can similarly be identified in the user interface. In some embodiments, after the file system 15 is restored through the file hosting service, the restored file system 15 may be synchronized with a local file system on a user device 14. Accordingly, the user interface may also inform a user that additional time may be necessary to complete such a synchronization after a restore.

In some embodiments, restoring a file system 15 may be throttled to prevent a user from wasting resources flipping between previous states at a high rate. In some embodiments, these conditions can be detected by tracking an average number of changes (moves, renames, deletes, restores, and the like) per unit of time and comparing this average to a threshold. When the threshold is satisfied or exceeded, changes may be sampled to keep only a predetermined set of changes per time period. Alternatively, the ability to restore (and the tracking changes) may be disabled (temporarily or permanently) in this situation. Throttling changes may be performed at the API level for the file hosting service.

Thus, embodiments described herein use the recycle bin, the version history, and a simple change log (tracking creations, moves, renames, recoveries, copies, and deletions) to provide a flexible, simplistic, and storage-efficient method for restoring a file system 15 to a particular point-in-time that does not require a traditional backup of the file system. Thus, embodiments described herein provide a restoration process that requires less memory than existing restoration processes and efficiently uses existing backup mechanisms, such as the recycle bin and version histories. As also described above, a version history may also be configured to apply particular rules to establish a consistent set of files for restoration purposes. For example, by maintaining a defined set of versions for a defined time period for each file, a set of versions is maintained for each file that allows the file system, as a whole, to be restored to multiple different points-in-time within the defined time period. Also, the changes tracked through a change log may similarly be used for auditing purposes, and, in some embodiments, the data described above as being tracked through a change log may be pulled from one or more existing audit logs maintained for a file system.

Various features and advantages of some embodiments are set forth in the following claims.

What is claimed is:

1. A system for restoring a file system to a state at a point-in-time, the system comprising:
an electronic processor configured to
receive the point-in-time,
automatically retrieve entries from a change log representing changes made to items within the file system after the point-in-time to identify items deleted from the file system after the point-in-time, items created within the file system after the point-in time, items moved within the file system after the point-in-time, items copied within the file system after the point-in-time, items renamed within the file system after the point-in-time, and items with content modified after the point-in-time, and
automatically process the entries retrieved from the change log in reverse order to roll back the changes made to the items within the file system after the point-in-time and restore the file system to the state at the point-in-time, wherein the electronic processor processes the entries retrieved from the change log by
automatically restoring, from a recycle bin, the items deleted from the file system after the point-in-time,
automatically deleting, from the file system, the items created within the file system after the point-in-time,
automatically moving the items moved within the file system after the point-in-time to a location within the file system associated with the point-in-time,
automatically deleting, from the file system, the items copied within the file system after the point-in-time,
automatically renaming the items renamed within the file system after the point-in-time to a name associated with the point-in-time, and
automatically restoring, from a version history, a version associated with the point-in-time for the items with content modified after the point-in-time.

2. The system of claim 1, wherein the items within the file system include at least one selected from a group consisting of a file and a folder.

3. The system of claim 1, wherein the electronic processor is further configured to define a maximum number of versions to be maintained by the version history and a minimum number of versions to be maintained by the version history per unit of time.

4. The system of claim 1, wherein the electronic processor is further configured to define a predetermined version to be retained per unit of time when multiple versions are available for a particular unit of time.

5. The system of claim 1, wherein the electronic processor is further configured to create the entries included in the change log in response to the changes made to the items within the file system, wherein each entry included in the change log includes a change date and time, an identifier of the item being changed, and an identifier of a type of change.

6. The system of claim 1, wherein at least one entry included in the change log includes at least one selected from a group consisting of an identifier of a parent item to the item being changed before the item is changed, a name of the item being changed before the item is changed, and a path of the item being changed before the item is changed.

7. The system of claim 1, wherein the electronic processor is further configured to restore the file system to the state at the point-in-time without restoring the recycle bin.

8. The system of claim 1, wherein the electronic processor is further configured to restore the file system to the state at the point-in-time without restoring the version history.

9. The system according to claim 1, wherein the electronic processor is further configured to save the version associated with the point-in-time for the items with content modified after the point-in-time automatically restored from the version history as a new version within the version history.

10. The system of claim 1, wherein the electronic processor is further configured to set a retention period of the recycle bin and the version history to a retention period of the change log.

11. The system of claim 1, wherein the electronic processor is further configured to generate a warning in response at least one selected from a group consisting of a manual purging of the recycle bin indicating that restoring the file system will be limited if the recycle bin is manually purged and a manual purging of the version history indicating that restoring the file system will be limited if the version history is manually purged.

12. The system of claim 1, wherein the electronic processor is further configured to use the change log for auditing purposes.

13. The system of claim 1, wherein the electronic processor is configured to retrieve the entries from the change log by retrieving the entries from at least one audit log.

14. The system of claim 1, wherein the electronic processor is configured to roll back the entries sequentially.

15. The system of claim 1, wherein the electronic processor is configured to roll back the entries in parallel.

16. The system of claim 1, wherein the electronic processor is configured to receive the point-in-time through at least one selected from a group consisting of a user interface and an application programming interface.

17. The system of claim 1, wherein the electronic processor is configured to receive the point-in-time from a monitoring system configured to detect suspicious activity occurring within the file system.

18. The system of claim 1, wherein the electronic processor is further configured to synchronize the file system as restored to the state at the point-in-time to at least one user device.

19. Non-transitory computer-readable medium storing instructions that, when executed by an electronic processor, perform a set of functions, the set of functions comprising:
receiving a point-in-time for restoring a file system to;
automatically retrieving entries from a change log representing changes made to items within the file system after the point-in-time to identify items deleted from the file system after the point-in-time, items created within the file system after the point-in time, items moved within the file system after the point-in-time, items copied within the file system after the point-in-time, items renamed within the file system after the point-in-time, and items with content modified after the point-in-time; and
automatically processing the entries retrieved from the change log in reverse order to roll back the changes made to the items within the file system after the point-in-time and restore the file system to a state at the point-in-time, wherein processing the entries retrieved from the change log includes
  automatically restoring, from a recycle bin, the items deleted from the file system after the point-in-time,
  automatically deleting, from the file system, the items created within the file system after the point-in-time,
  automatically moving the items moved within the file system after the point-in-time to a location within the file system associated with the point-in-time,
  automatically deleting, from the file system, the items copied within the file system after the point-in-time,
  automatically renaming the items renamed within the file system after the point-in-time to a name associated with the point-in-time, and
  automatically restoring, from a version history, a version associated with the point-in-time for the items with content modified after the point-in-time.

20. A method of restoring a file system to a state at a point-in-time, the method comprising:
  creating an entry in a change log for each change made to the file system, each entry including an identifier of an item changed within the file system, a date and time the item was changed within the file system, and a type of change made to the item;
  receiving, with an electronic processor, the point-in-time;
  automatically, with the electronic processor, retrieving a set of entries from the change log representing changes made to items within the file system after the point-in-time to identify items deleted from the file system after the point-in-time, items created within the file system after the point-in time, items moved within the file system after the point-in-time, items copied within the file system after the point-in-time, items renamed within the file system after the point-in-time, and items with content modified after the point-in-time; and
  automatically processing, with the electronic processor, the entries retrieved from the change log in reverse order to automatically roll back the changes made to the items within the file system after the point-in-time and restore the file system to the state at the point-in-time, wherein automatically processing the entries retrieved from the change log includes
    automatically restoring, from a recycle bin, the items deleted from the file system after the point-in-time,
    automatically deleting, from the file system, the items created within the file system after the point-in-time,
    automatically moving the items moved within the file system after the point-in-time to a location within the file system associated with the point-in-time,
    automatically deleting, from the file system, the items copied within the file system after the point-in-time,
    automatically renaming the items renamed within the file system after the point-in-time to a name associated with the point-in-time, and
    automatically restoring, from a version history, a version associated with the point-in-time for the items with content modified after the point-in-time; and
  synchronizing the file system as restored to the state at the point-in-time to at least one user device.

* * * * *